(12) United States Patent
Akatsu et al.

(10) Patent No.: US 6,952,069 B2
(45) Date of Patent: Oct. 4, 2005

(54) ELECTRIC MACHINE WITH INNER AND OUTER ROTOR

(75) Inventors: Kan Akatsu, Tokyo (JP); Sachiko Taguchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/476,062

(22) PCT Filed: Mar. 28, 2003

(86) PCT No.: PCT/JP03/03920
§ 371 (c)(1), (2), (4) Date: Oct. 28, 2003

(87) PCT Pub. No.: WO03/084033
PCT Pub. Date: Oct. 9, 2003

(65) Prior Publication Data
US 2004/0130229 A1 Jul. 8, 2004

(30) Foreign Application Priority Data
Apr. 1, 2002 (JP) .................. 2002-098633

(51) Int. Cl.⁷ ............................................. H02K 16/02
(52) U.S. Cl. .................... 310/266; 310/254; 310/259
(58) Field of Search ............................. 310/114, 254, 310/266, 259

(56) References Cited

U.S. PATENT DOCUMENTS 6,226,856 B1 * 5/2001 Kazama et al. ............... 29/596
6,847,137 B2   1/2002 Furuse
6,472,788 B1  10/2002 Nakano

FOREIGN PATENT DOCUMENTS

| EP | 1 096 648 A2 | 5/2001 | |
|----|----|----|----|
| EP | 1191673 A2 * | 3/2004 | .......... H02K/16/02 |
| JP | 54041401 * | 2/1979 | .......... H02K/16/02 |
| JP | 11-356015 A | 12/1999 | |
| JP | 2001-25185 A | 1/2001 | |
| JP | 2001-359261 A | 12/2001 | |

* cited by examiner

Primary Examiner—Burton Mullins
(74) Attorney, Agent, or Firm—Foley & Lardner LLP

(57) ABSTRACT

An electric rotating machine including inner and outer rotors coaxially disposed and driven by a compound current, and a stator disposed between the rotors. Each of the rotors includes a plurality of permanent magnets circumferentially arranged. The stator includes a stator core and a coil to which the compound current is applied. The stator core includes a plurality of circumferentially arranged stator pieces with the coils. The stator pieces have a same shape and are formed by plates laminated in axial alignment with each other. Each stator piece includes inner and outer yokes disposed radially inside and outside, respectively, and a coil area defined between the yokes. The stator pieces adjacent to one another include a first air gap circumferentially formed between the adjacent outer yokes, a second air gap circumferentially formed between the adjacent inner yokes and mutual contact portions circumferentially contacted at the inner yokes.

13 Claims, 7 Drawing Sheets

ELECTRIC MACHINE WITH INNER AND OUTER ROTOR

BACKGROUND OF THE INVENTION

The present invention relates to an electric rotating machine, and more specifically, to an electric rotating machine including coaxially disposed inner and outer rotors and a stator disposed between the inner and outer rotors.

Japanese Patent Application First Publication No. 11-356015 discloses an electric rotating machine including a stator having a single coil and two rotors which are different in number of magnetic poles from each other and coaxially disposed inside and outside the stator. The stator and the inner and outer rotors form a three-layered structure. The inner and outer rotors are independently driven by applying a compound current to the coil of the stator. Upon application of the compound current, the stator generates two rotating magnetic fields respectively exerted to the two rotors.

FIG. 13 illustrates a stator core useable in the stator of the three-layered electric rotating machine of the related art explained above. As illustrated in FIG. 13, stator core 100 includes a plurality of stator pieces 11. Each of stator pieces 11 has a predetermined shape to form a magnetic circuit which allows passage of magnetic flux. Stator piece 11 is formed by laminating a plurality of steel plates. Stator piece 11 radially extends and has outer yoke 15 and inner yoke 16. Stator pieces 11 are circumferentially spaced from each other with air gaps 12 between outer yokes 15 of adjacent stator pieces 11 and between inner yokes 16 thereof. Generally, in the stator for the three-layered electric rotating machine driven by the compound current, air gap 12 between adjacent stator pieces 11 is formed in order to prevent flux leakage of stator core 100 relative to the inner and outer rotors. In the case of an electric rotating machine having one rotor and a stator, stator pieces of the stator are continuously connected with each other without air gap therebetween to thereby form a magnetic path or a magnetic circuit between the rotor and the stator. Coil area 13 is formed between outer and inner yokes 15 and 16. Bolt hole 14 is disposed on the side of inner yoke 16 between adjacent stator pieces 11. Coil is inserted into coil area 13 and wound on stator piece 11. Stator core 100 with the coils are interposed between brackets disposed on opposed axial ends of stator core 100. Fastening bolts are inserted into bolt holes 14 and tightened to cause a friction force between stator core 100 and the brackets. Owing to the friction force, stator core 100 is fixedly supported between the brackets.

SUMMARY OF THE INVENTION

As an output of the electric rotating machine becomes large, there occurs a force applied to the respective stator pieces of the stator core so as to move the stator pieces spaced with the air gap. Therefore, in order to fixedly retain all of the stator pieces between the brackets, it is required to increase a bearing surface pressure acting on contact surfaces of the stator core and the brackets. This causes increase in torque of tightening the bolts, whereby a diameter of the bolts used in the stator of the electric rotating machine of the related art must be increased.

An object of the present invention is to solve the above-described problem and to provide an electric rotating machine in which a stator core can be fixedly supported without increasing a diameter of fastening bolts and the flux leakage relative to the inner rotor can be prevented.

In one aspect of the present invention, there is provided an electric rotating machine, comprising:

an inner rotor including a plurality of permanent magnets circumferentially arranged;

an outer rotor including a plurality of permanent magnets circumferentially arranged, the inner rotor and the outer rotor being coaxially disposed and driven by a compound current; and a stator disposed between the inner rotor and the outer rotor, the stator including a stator core and a coil to which the compound current is applied, the stator core including a plurality of circumferentially arranged stator pieces on each of which the coil is wound, the stator pieces having a same shape and being formed by plates laminated in axial alignment with each other, each of the stator pieces including an inner yoke disposed radially inside, an outer yoke disposed radially outside and a coil area defined between the inner and outer yokes in which the coil is disposed, the stator pieces adjacent to one another including a first air gap circumferentially formed between the adjacent outer yokes thereof, a second air gap circumferentially formed between the adjacent inner yokes thereof and mutual contact portions circumferentially contacted at the inner yokes thereof.

DETAILED DESCRIPTION OF THE PREFERRED EMBODIMENT

Figure 1:
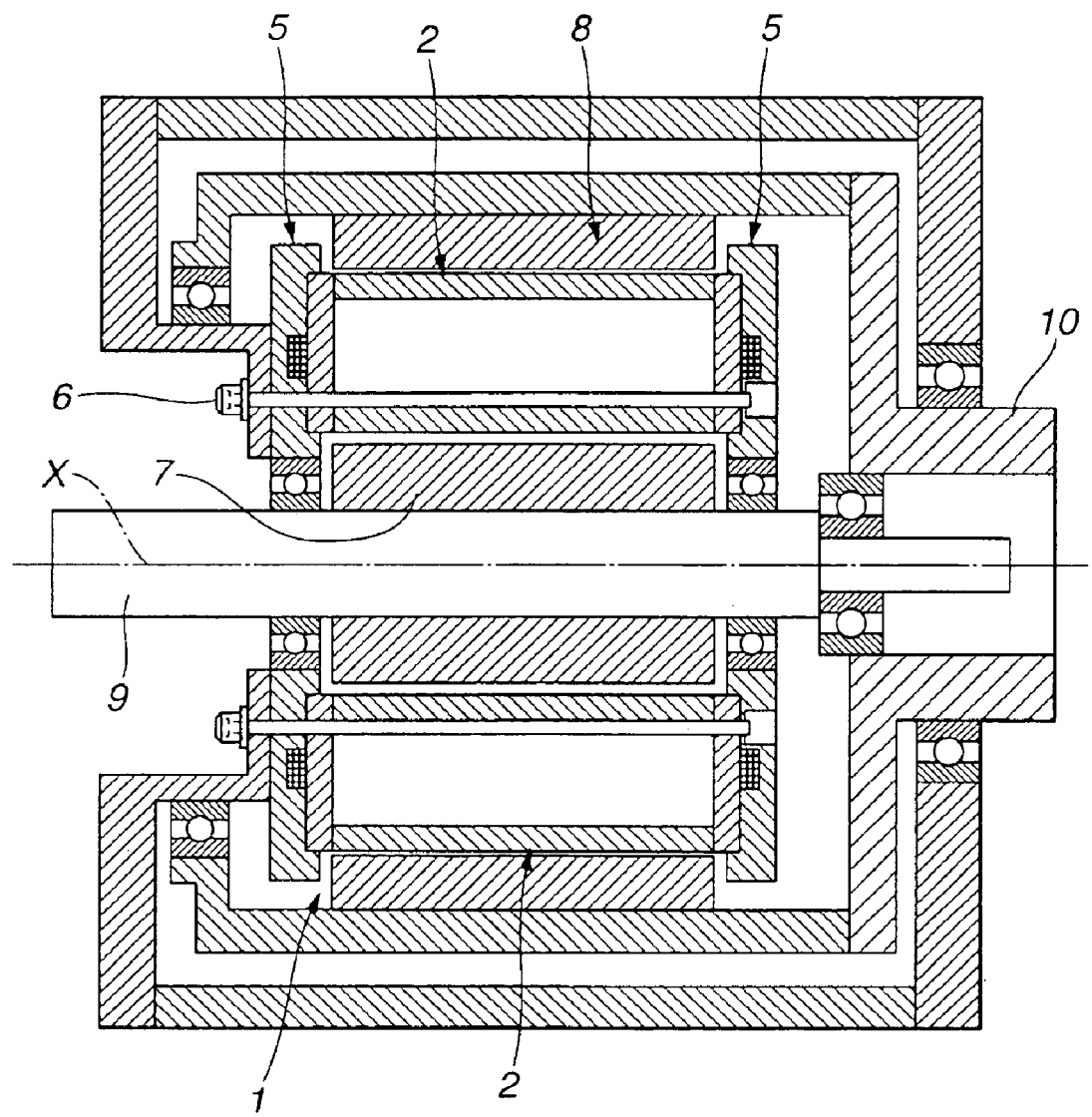
FIG. 1 is a cross-section of an electric rotating machine according to the present invention, taken along a center axis thereof, showing inner and outer rotors and a stator between the inner and outer rotors.

Referring now to FIG. 1, a construction of an electric rotating machine of the present invention is explained. As illustrated in FIG. 1, the electric rotating machine includes inner rotor 7, outer rotor 8 and stator 1 disposed between inner and outer rotors 7 and 8. Inner rotor 7 is mounted to inner rotor shaft 9, and outer rotor 8 is mounted to outer rotor shaft 10. Inner and outer rotor shafts 9 and 10 have center axes aligned with center axis X of the electric rotating machine. Stator 1 and inner and outer rotors 7 and 8 are coaxially arranged and superimposed in a radial direction. Thus, the electric rotating machine has a three-layered structure. Each of inner rotor 7 and outer rotor 8 are formed by a permanent magnet. Inner and outer rotors 7 and 8 are different in number of N-S pole pairs. For instance, outer rotor 8 has the number of N-S pole pairs which is twice that of inner rotor 7. N poles and S poles are circumferentially alternately arranged.

Stator 1 includes stator core 2 and axially opposed brackets 5 between which stator core 2 is interposed in contact with brackets 5. Stator core 2 is fixed to brackets 5 using bolts 6 which extend through stator core 2 and brackets 5. Stator core 2 is secured to brackets 5 by the friction force generated between the mutual contact surfaces of stator core 2 and brackets 5. Coil 28 is wound on stator core 2, to which compound current is applied. The compound current is composed of an alternating current generating a rotating magnetic field for the inner rotor and an alternating current generating a rotating magnetic field for the outer rotor. Inner rotor 7 and outer rotor 8 are independently driven by applying the compound current to coil 28 of stator core 2.

Figure 2:
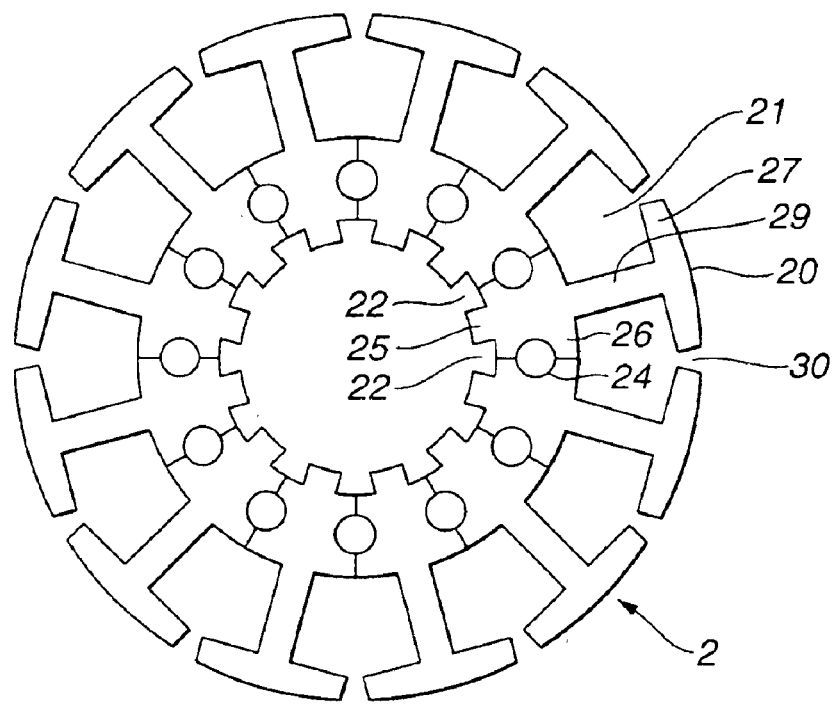
FIG. 2 shows a stator core of a first embodiment when viewed from the axial direction.
Figure 3:
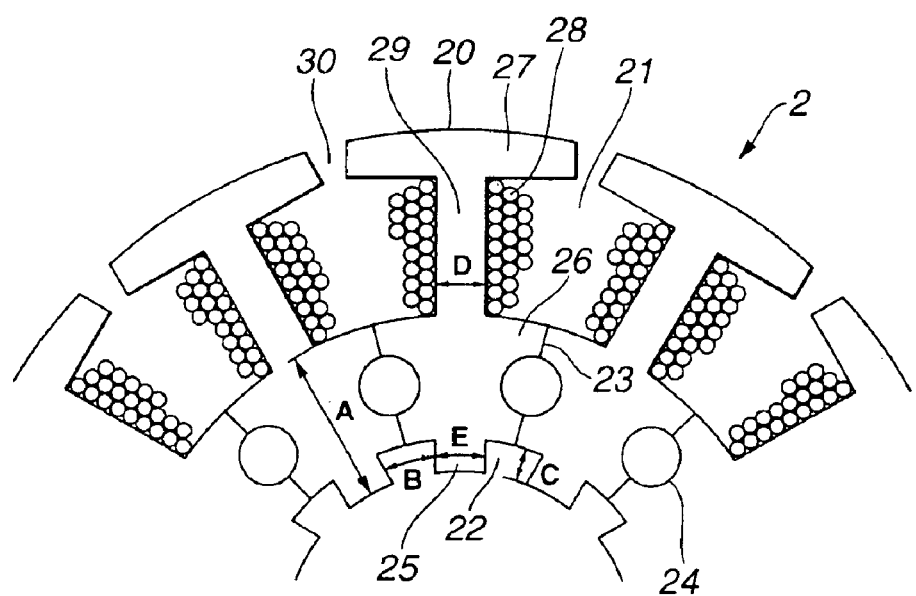
FIG. 3 is a partial enlarged view of the stator core of FIG. 2, showing a coil wound on the stator core.

Referring to FIGS. 2 and 3, stator core 2 will be explained. As illustrated in FIG. 2, stator core 2 has a generally ring-shape and includes a plurality of stator pieces 20 circumferentially arranged. Stator pieces 20 have a same shape and are formed by steel plates laminated in axial alignment with each other. As shown in FIG. 3, each of stator pieces 20 includes body portion 29 on which coil 28 is wound, inner yoke 26 and outer yoke 27 which are disposed on a radial inside and a radial outside of body portion 29 and connected with each other by body portion 29. Inner yoke 26 is located on the side of inner rotor 7, and outer yoke 27 is located on the side of outer rotor 8. Coil area 21 is defined between inner and outer yokes 26 and 27 and body portion 29, in which coil 28 is disposed. Stator pieces 20 adjacent to one another define first air gap 30 circumferentially formed between outer yokes 27, second air gap 22 circumferentially formed between inner yokes 26, and mutual contact portions 23 circumferentially contacted at inner yokes 26. Specifically, outer yoke 27 circumferentially projects and cooperates with body portion 29 to form a generally T-shape. First air gap 30 is formed by opposed outer yokes 27 of adjacent stator pieces 20. Inner yoke 26 circumferentially extends and has two radial recesses radially outward recessed from an inner peripheral edge thereof. The radial recesses are circumferentially spaced from each other to define radially inward extending projection 25 therebetween. Thus, projection 25 is a circumferentially intermediate portion between the radial recesses. Each of radial recesses cooperates with a radial recess of inner yoke 26 of adjacent stator piece 20 to form second air gap 22. Inner yoke 26 has contact portions 23 on circumferential opposite side peripheries thereof. Each of contact portions 23 is in contact with contact portion 23 of inner yoke 26 of adjacent stator piece 20. Contact portion 23 includes two contact regions which are disposed on the side of inner rotor 7 and on the side of coil area 21, respectively. Bolt hole 24 is disposed between the contact regions of contact portions 23 mutually contacted between inner yokes 26 of adjacent stator pieces 20. Namely, a half of bolt hole 24 is formed on each of the circumferential opposite side peripheries of inner yoke 26. Bolt 6 inserted into bolt hole 24 makes no clearance between an outer periphery thereof and a hole surrounding portion of inner yoke 26 which defines bolt hole 24.

Figure 4:
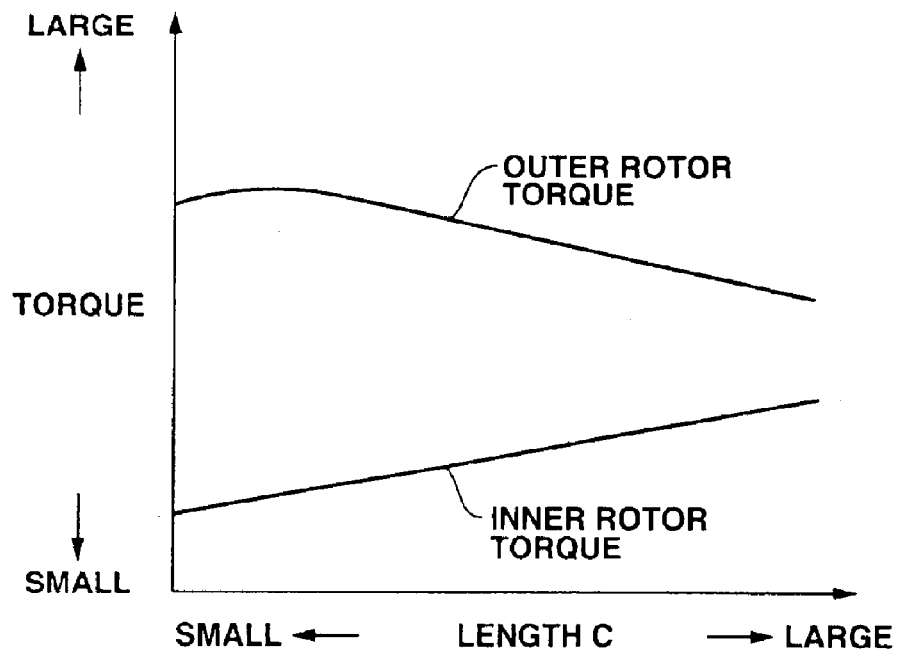
FIG. 4 is a graph showing a relationship between a torque of each of the inner and outer rotors and a parameter used in the first embodiment.

As illustrated in FIG. 3, second air gap 22 has radial length C, and projection 25 has radial length A. Characteristics of torques acting on inner rotor 7 and outer rotor 8, respectively, are determined by a ratio of radial length C to radial length A. FIG. 4 shows a relationship between radial length C and the torque acting on inner rotor 7 (hereinafter referred to as inner rotor torque) and the torque acting on outer rotor 8 (hereinafter referred to as outer rotor torque). As shown in FIG. 4, if radial length C increases under condition that radial length A is kept constant, the inner rotor torque will increase and the outer rotor torque will decrease. In this case, the magnetic resistance between inner peripheral portions of adjacent inner yokes 26, namely, the magnetic resistance thereof on the side of inner rotor 7, increases so that flux leakage of stator core 2 relative to inner rotor 7 decreases. This allows efficient interlinkage of the magnetic flux of inner rotor 7 with that of stator core 2, increasing the inner rotor torque. In contrast, the flux linkage between outer rotor 8 and stator core 2 decreases so that the outer rotor torque decreases. On the contrary, if radial length C decreases under the same condition, the outer rotor torque will increase and the inner rotor torque will decrease. Thus, the inner rotor torque and the outer rotor torque, namely, the magnetic resistance of stator core 2 on the side of each of inner and outer rotors 7 and 8, can be varied and set to desired values by changing the ratio of radial length C to radial length A.

As shown in FIG. 3, second air gap 22 has circumferential length B, body portion 29 has circumferential length D, and projection 25 has circumferential length E. Here, characteristics of the inner rotor torque and the outer rotor torque are determined depending on effective sectional area of stator core 2. The effective sectional area is determined based on a smallest circumferential length of stator piece 20. Circumferential length D of body portion 29 is set as the smallest circumferential length of stator piece 20. Circumferential length B is determined such that circumferential length E is not less than circumferential length D. If circumferential length E increases under condition that a sum of circumferential length B and circumferential length E is kept constant, the inner rotor torque will decrease and the outer rotor torque will increase. In a case where circumferential length B is determined such that circumferential length E is smaller than circumferential length D, the effective sectional area of stator core 2 is determined based on circumferential length E. In this case, even if circumferential length D more increases, the magnetic flux interlinkable with stator core 2 will not increase.

As described above, the magnetic resistance of stator core 2 on the side of inner rotor 7 and the magnetic resistance thereof on the side of outer rotor 8 can be desirably controlled by adequately selecting the positions of second air gap 22 and contact portion 23 of stator core 2 as well as radial lengths C and A thereof. This can reduce flux leakage of stator core 2 relative to inner rotor 7, allowing a main magnetic flux of outer rotor 8 to pass through stator core 2. Further, since adjacent stator pieces 20 are in contact with one another at contact portions 23 thereof, stator core 2 can be enhanced in rigidity in the circumferential direction as compared with the stator core of the related art in which the stator pieces are spaced from one another. This can retain stator core 2 without using bolts having an increased diameter even if a torque of the electric rotating machine is increased. Further, second air gap 22 is disposed on the radial inside of adjacent stator pieces 20, namely, on the side of inner rotor 7, and contact portion 23 is disposed on the radial outside thereof, namely, on the side of outer rotor 8. With this arrangement of second air gap 22 and contact portion 23, stator core 2 can be increased in rigidity. Furthermore, reduction of the magnetic flux interlinkable with stator core 2 can be prevented by setting radial length B of second air gap 22 based on the above-described relationship between circumferential length D of body portion 29 and circumferential length E of projection 25.

Figure 5:
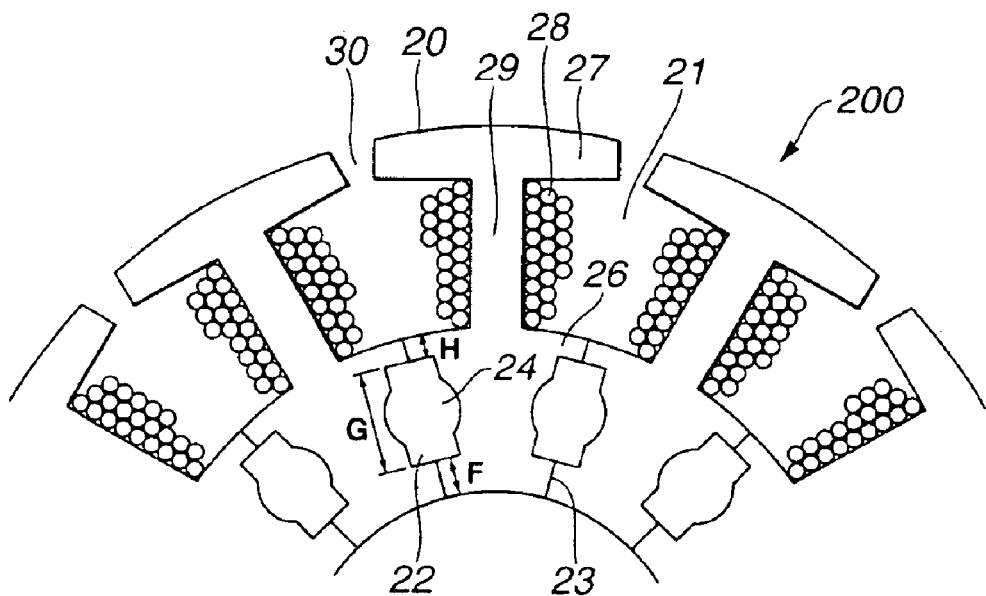
FIG. 5 is a view similar to FIG. 3, but showing a second embodiment of the stator core when viewed from the axial direction.

Referring now to FIG. 5, a second embodiment of the stator core is explained, which differs in arrangement of second air gap 22 from the first embodiment. Like reference numerals denote like parts, and therefore, detailed explanations therefor are omitted. As illustrated in FIG. 5, second air gap 22 formed by adjacent stator pieces 20 of stator core 200 is located at a radially middle position of contact portion 23 of inner yoke 26. Contact portion 23 includes two contact regions which are disposed on the side of inner rotor 7 and on the side of outer rotor 8, respectively. Second air gap 22 is disposed between the contact regions of contact portion 23. Second air gap 22 is defined by a generally rectangular opening. Bolt hole 24 is arranged in an overlapped relation to second air gap 22. In this embodiment, a bolt may be made of non-magnetic material when there exists no clearance between an outer periphery of the bolt and a periphery of bolt hole 24. The bolt made of non-magnetic material exerts no influence on the effect of second air gap 22. Otherwise, if the bolt is made of magnetic material, the bolt may be disposed in bolt hole 24 with a clearance between the outer periphery of the bolt and the periphery of bolt hole 24. As illustrated in FIG. 5, second air gap 22 has radial length G. Radial length F extends between an inner peripheral edge of inner yoke 26 and an inner end of second air gap 22. Radial length H extends between an outer end of second air gap 22 and an outer peripheral edge of inner yoke 26 which defines coil area 21. In other words, radial length F is a length of the radial inside contact region of contact portion 23, and radial length H is a length of the radial outside contact region of contact portion 23. The inner rotor torque and the outer rotor torque can be controlled by adjusting radial length F, radial length G and radial length H. If radial length G of second air gap 22 increases, the inner rotor torque will increase and the outer rotor torque will decrease.

Figure 6:
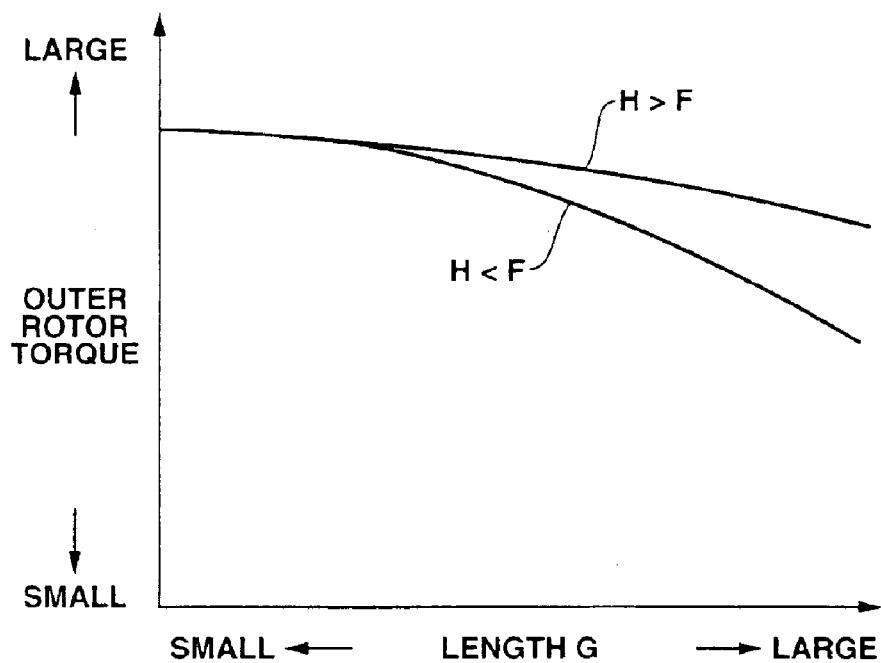
FIG. 6 is a graph showing a relationship between a torque of the outer rotor and parameters used in the second embodiment.

FIG. 6 shows a relationship between these parameters F, G and H and the outer rotor torque. Further, a variation of the outer rotor torque relative to radial length G can be controlled by adjusting a ratio between radial length F and radial length H. If radial length F is smaller than radial length H, rate of reduction in the outer rotor torque will be lessened even when radial length G increases, as compared with a case where radial length F is larger than radial length H.

In the second embodiment, the circumferential length extending between adjacent second air gaps 22 and the circumferential length extending between adjacent bolt holes 24 are not less than the circumferential length of body portion 29.

Figure 7:
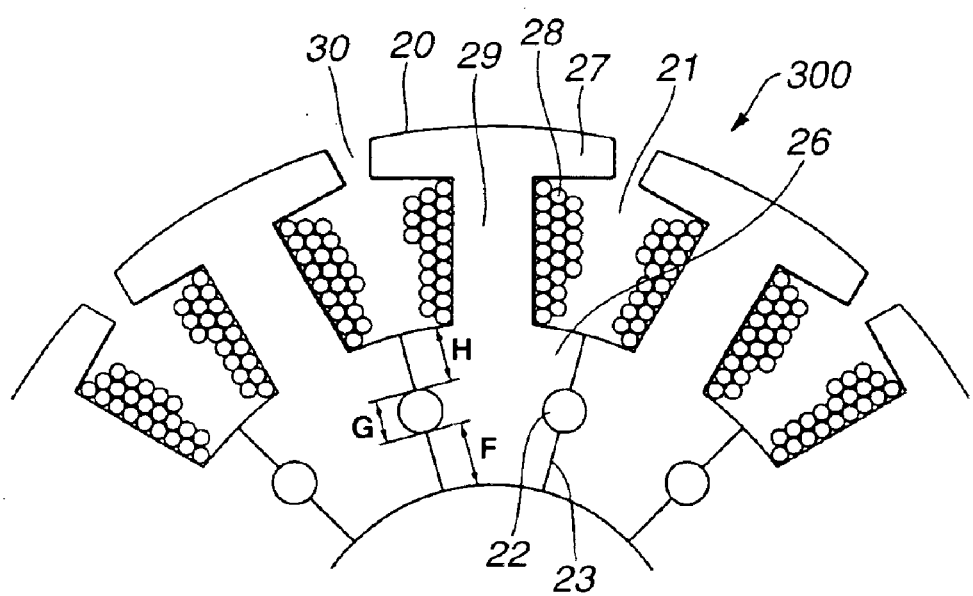
FIG. 7 is a view similar to FIG. 3, but showing a third embodiment of the stator core when viewed from the axial direction.

FIG. 7 shows a third embodiment of the stator core, which differs in shape of the opening defining second air gap 22 from the second embodiment. As illustrated in FIG. 7, each of stator pieces 20 of stator core 300 includes second air gap 22 defined by a circular opening. A circumferential length of an intermediate portion between adjacent second air gaps 22 is not less than the circumferential length of body portion 29. A bolt made of non-magnetic material is inserted into second air gap 22, and therefore, no separate bolt hole may be formed. This serves for reduction in dimension of stator core 300.

In the second and third embodiments, adjacent stator pieces 20 are in contact with one another at the inner peripheral portions thereof which are located on the side of inner rotor 7 and undergo a torque reaction force generated by inner rotor 7. With this arrangement of the second and third embodiments, stator cores 200 and 300 and stator 1 as a whole can be enhanced in rigidity. In these embodiments, the same effects as described in the first embodiment can be obtained.

Figure 8:
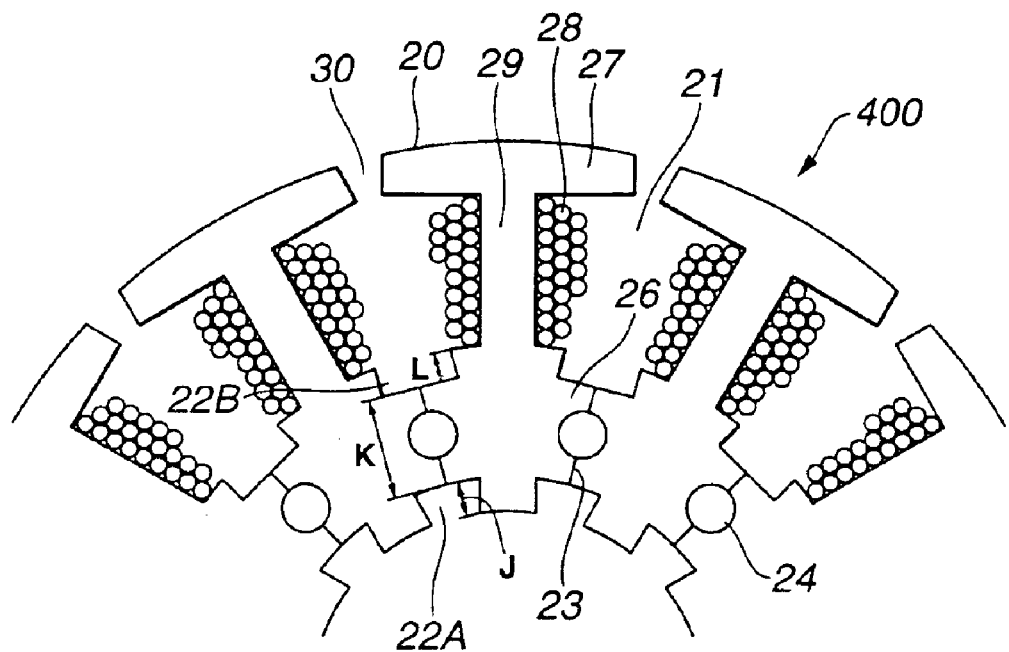
FIG. 8 is a view similar to FIG. 3, but showing a fourth embodiment of the stator core when viewed from the axial direction.
Figure 9:
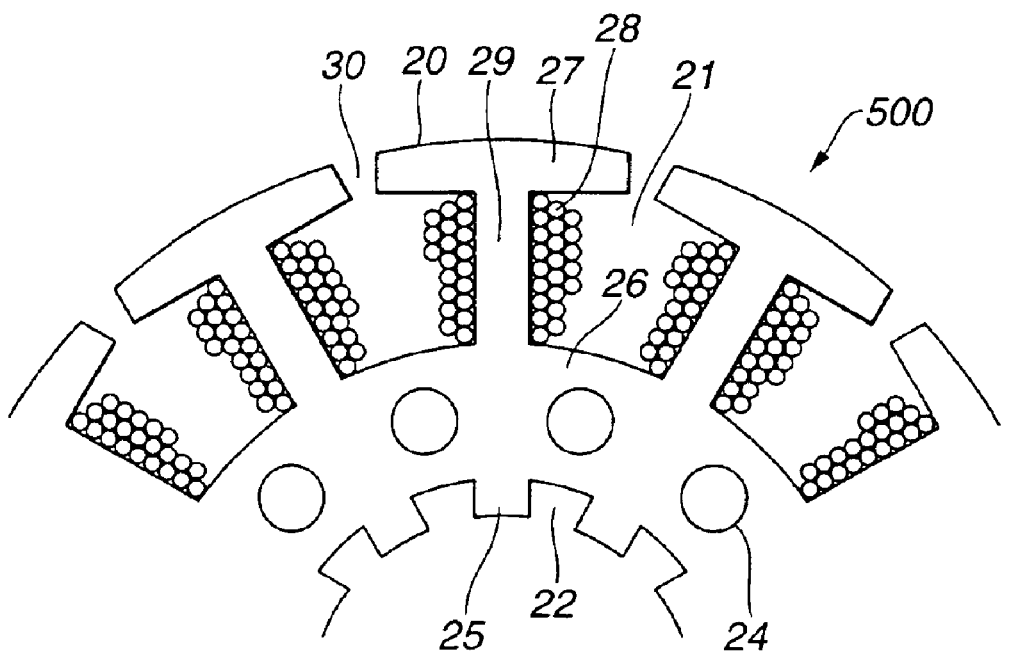
FIG. 9 is a view similar to FIG. 3, but showing a modification of the first embodiment of the stator core.
Figure 10:
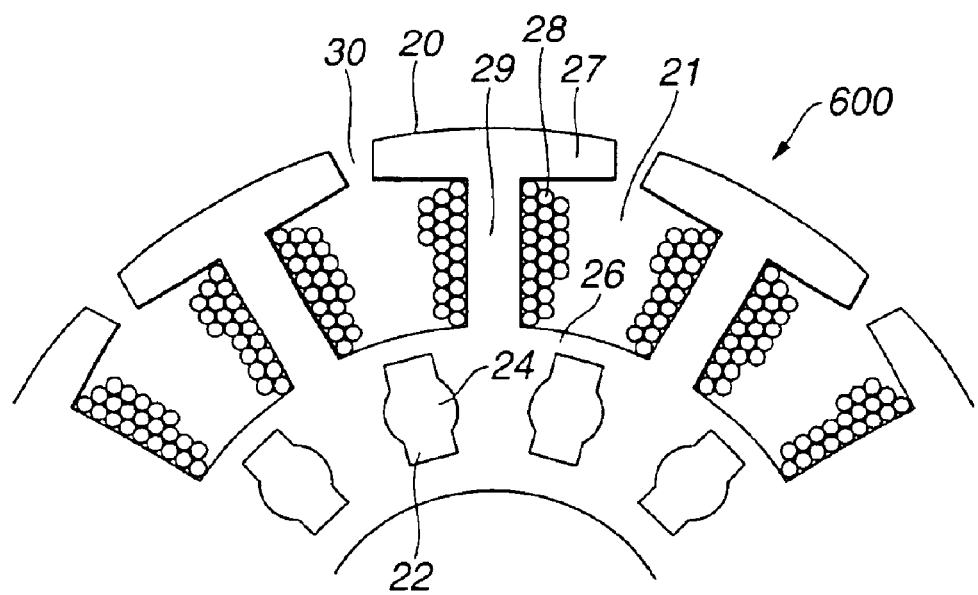
FIG. 10 is a view similar to FIG. 5, but showing a modification of the second embodiment of the stator core.
Figure 11:
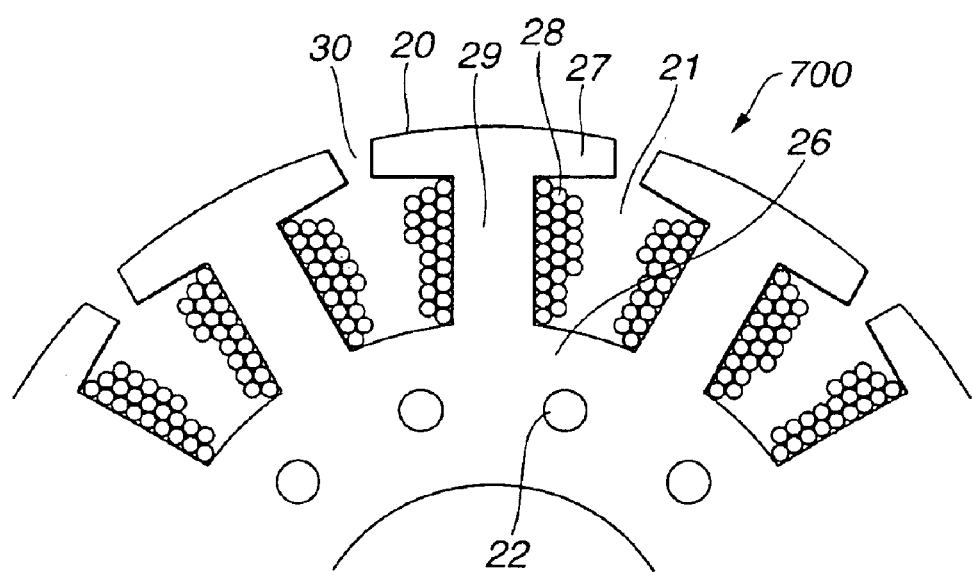
FIG. 11 is a view similar to FIG. 7, but showing a modification of the third embodiment of the stator core.
Figure 12:
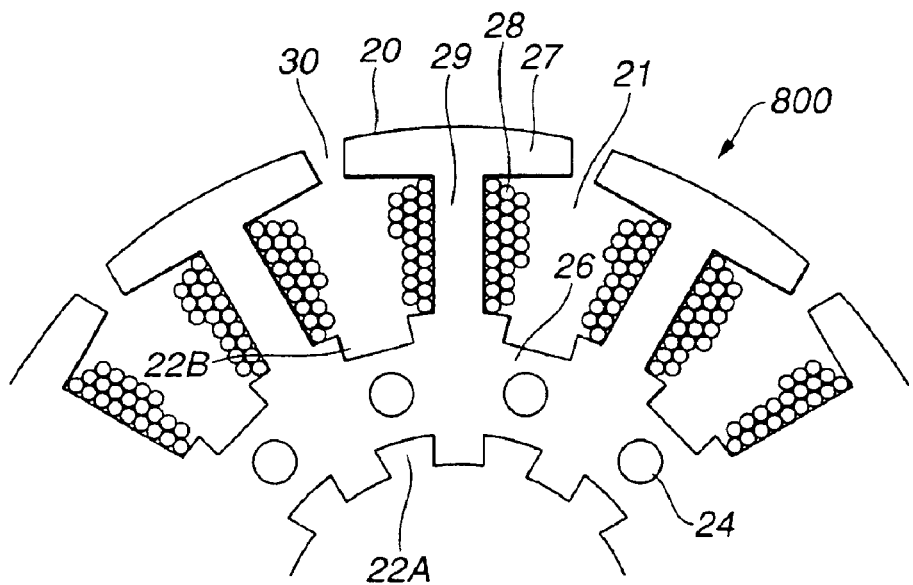
FIG. 12 is a view similar to FIG. 8, but showing a modification of the fourth embodiment of the stator core.
Figure 13:
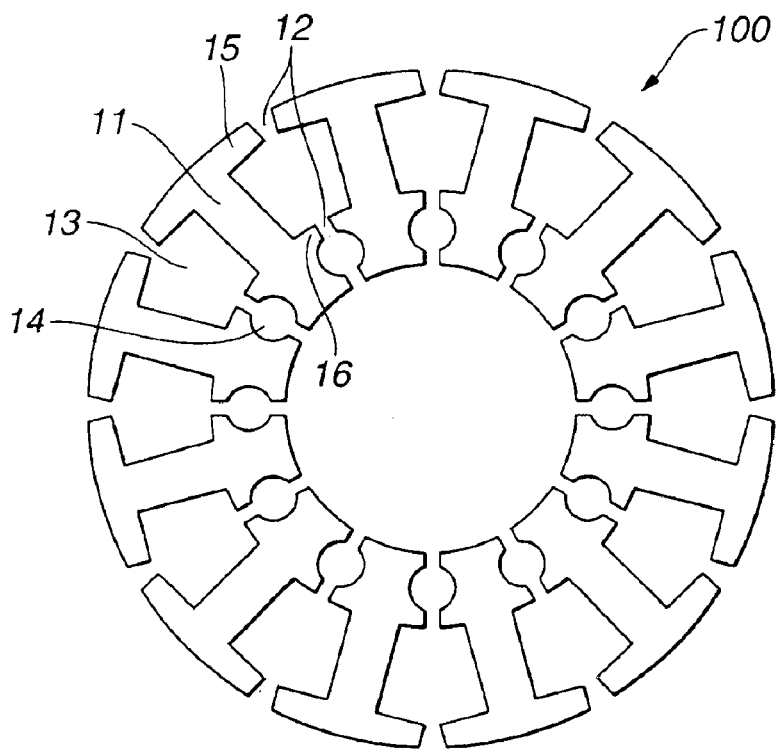
FIG. 13 shows a stator core of an electric rotating machine of a related art.

Referring to FIG. 8, a fourth embodiment of the stator core will be explained. As illustrated in FIG. 8, stator pieces 20 of stator core 400 have inner air gap 22A and outer air gap 22B which are radially spaced from each other. Inner air gap 22A and outer air gap 22B are disposed in an inner periphery of inner yoke 26 and an outer periphery thereof, respectively. Inner air gap 22A is formed on the side of inner rotor 7, and outer air gap 22B is formed on the side of coil area 21, namely, on the side of outer rotor 8. Inner air gap 22A is defined by a radial inner recess radially outward recessed from the inner peripheral edge of inner yoke 26. A radially inward extending projection is formed between adjacent inner air gaps 22A. Outer air gap 22B is defined by a radial outer recess radially inward recessed from the outer peripheral edge of inner yoke 26. A radially outward extending projection is formed between adjacent outer air gaps 22B. Contact portion 23 extends between inner air gap 22A and outer air gap 22B and in contact with contact portion 23 of inner yoke 26 of adjacent stator piece 20. Bolt hole 24 is located in a middle position of adjacent contact portions 23 mutually contacted with each other. In this embodiment, the inner rotor torque and the outer rotor torque are controlled by adjusting radial length J of inner air gap 22A, radial length K of contact portion 23, and radial length L of outer air gap 22B. Circumferential lengths of inner and outer air gaps 22A and 22B may be set different from each other under condition that a circumferential length of the radially inward projection and a circumferential length of the radially outward projection are not less than the circumferential length of body portion 29. If radial length J of inner air gap 22A increases, the inner rotor torque will increase. On the other hand, the outer rotor torque is varied depending on radial length K of contact portion 23. A Bolt made of magnetic material may be inserted into bolt hole 24 to thereby magnetically connect adjacent stator pieces 20. In this case, main magnetic flux of outer rotor 8 can pass through the bolt, and therefore, a dimension of stator core 400 can be reduced.

With the construction of stator core 400, the flux leakage relative to inner rotor 7 can be prevented by inner air gap 22A, and the flux leakage of coil 28 can be prevented by outer air gap 22B. Main magnetic flux of outer rotor 8 can pass through contact portion 23. The inner rotor torque and the outer rotor torque can be set to desired values, and the flux leakage relative to inner and outer rotors 7 and 8 can be suppressed. Further, stator core 400 can be enhanced in rigidity.

FIGS. 9–12 illustrate modifications of the first to fourth embodiments of the stator core. In FIGS. 9–12, stator cores 500, 600, 700 and 800 are formed by laminated steel plates. Each of the steel plates is an integral plate body formed by connecting stator pieces 20 of each of stator cores 2, 200, 300 and 400 of the first to fourth embodiments together via contact portions 23. In these modifications, each of stator cores 500, 600, 700 and 800 as a whole can be improved in rigidity in the circumferential direction.

This application is based on prior Japanese Patent Application No. 2002-098633 filed on Apr. 1, 2002, the entire contents of which are hereby incorporated by reference.

Although the invention has been described above by reference to certain embodiments and modifications of the invention, the invention is not limited to the embodiments and modifications described above. Other modifications and variations of the embodiments and modifications described above will occur to those skilled in the art in light of the above teachings.

The scope of the invention is defined with reference to the following claims.

What is claimed is:

1. An electric rotating machine, comprising:
   an inner rotor including a plurality of permanent magnets circumferentially arranged;
   an outer rotor including a plurality of permanent magnets circumferentially arranged, the inner rotor and the outer rotor being coaxially disposed and driven by a compound current;
   a stator disposed between the inner rotor and the outer rotor, the stator including a stator core and a coil to which the compound current is applied, the stator core including a plurality of circumferentially arranged stator pieces on each of which the coil is wound, the stator pieces having a same shape and being formed by plates laminated in axial alignment with each other, each of the stator pieces including an inner yoke disposed radially inside, an outer yoke disposed radially outside and a coil area defined between the inner and outer yokes in which the coil is disposed, the stator pieces adjacent to one another including a first air gap circumferentially formed between the adjacent outer yokes thereof, a second air gap circumferentially formed between the adjacent inner yokes thereof and mutual contact portions circumferentially contacted at the inner yokes thereof; and
   wherein a contact portion comprises two contact regions disposed on the side of the inner rotor and on the side of the outer rotor, respectively, the second air gap being disposed between the two contact regions.

2. The electric rotating machine as claimed in claim 1, wherein each of the stator pieces comprises a body portion connecting the inner and outer yokes and retaining the coil wound thereon, and an intermediate portion disposed between the second air gaps, the intermediate portion having a circumferential length not less than a circumferential length of the body portion.

3. The electric rotating machine as claimed in claim 2, wherein the second air gap is defined by a radial recess formed on an inner periphery of the inner yoke, the intermediate portion being a projection formed between the adjacent two radial recesses.

4. The electric rotating machine as claimed in claim 1, further comprising a bolt connecting the stator pieces, the bolt extending in a bolt hole formed in the contact portion.

5. The electric rotating machine as claimed in claim 1, further comprising a bolt connecting the stator pieces, the bolt extending in the second air gap.

6. The electric rotating machine as claimed in claim 5, wherein the second air gap is defined by an opening having a circular shape.

7. The electric rotating machine as claimed in claim 6, wherein the bolt is made of non-magnetic material.

8. An electric rotating machine, comprising:
   an inner rotor including a plurality of permanent magnets circumferentially arranged;
   an outer rotor including a plurality of permanent magnets circumferentially arranged, the inner rotor and the outer rotor being coaxially disposed and driven by a compound current;
   a stator disposed between the inner rotor and the outer rotor, the stator including a stator core and a coil to which the compound current is applied, the stator core including a plurality of circumferentially arranged stator pieces on each of which the coil is wound, the stator pieces having a same shape and being formed by plates laminated in axial alignment with each other, each of the stator pieces including an inner yoke disposed radially inside, an outer yoke disposed radially outside and a coil area defined between the inner and outer yokes in which the coil is disposed, the stator pieces adjacent to one another including a first air gap circumferentially formed between the adjacent outer yokes thereof, a second air gap circumferentially formed between the adjacent inner yokes thereof and mutual contact portions circumferentially contacted at the inner yokes thereof,
   wherein the second air gap comprises an inner air gap and an outer air gap radially spaced from the inner air gap, the inner and outer air gaps being disposed on the side of the inner rotor and on the side of the outer rotor, respectively, the contact portion being disposed between the inner and outer air gaps.

9. The electric rotating machine as claimed in claim 8, wherein each of the stator pieces comprises a body portion connecting the inner and outer yokes and retaining the coil wound thereon, and two intermediate portions disposed between adjacent inner air gaps and between adjacent outer air gaps, each of the two intermediate portions having a circumferential length not less than a circumferential length of the body portion.

10. The electric rotating machine as claimed in claim 9, wherein the inner air gap and the outer air gap are defined by a radial inner recess formed on an inner periphery of the inner yoke and a radial outer recess formed on an outer periphery thereof, respectively, the two intermediate portions being projections which are formed between adjacent radial inner recesses and between adjacent radial outer recesses, respectively.

11. The electric rotating machine as claimed in claim 8, further comprising a bolt connecting the stator pieces, the bolt extending in a bolt hole formed in the contact portion, the bolt being made of magnetic material.

12. The electric rotating machine as claimed in claim 8, wherein the stator pieces are connected together via the contact portions to form an integral plate body.

13. The electric rotating machine as claimed in claim 8, wherein the inner air gap and the outer air gap are defined by a radial inner recess formed on an inner periphery of the inner yoke and a radial outer recess formed on an outer periphery of the inner yoke, respectively.

* * * * *